UNITED STATES PATENT OFFICE.

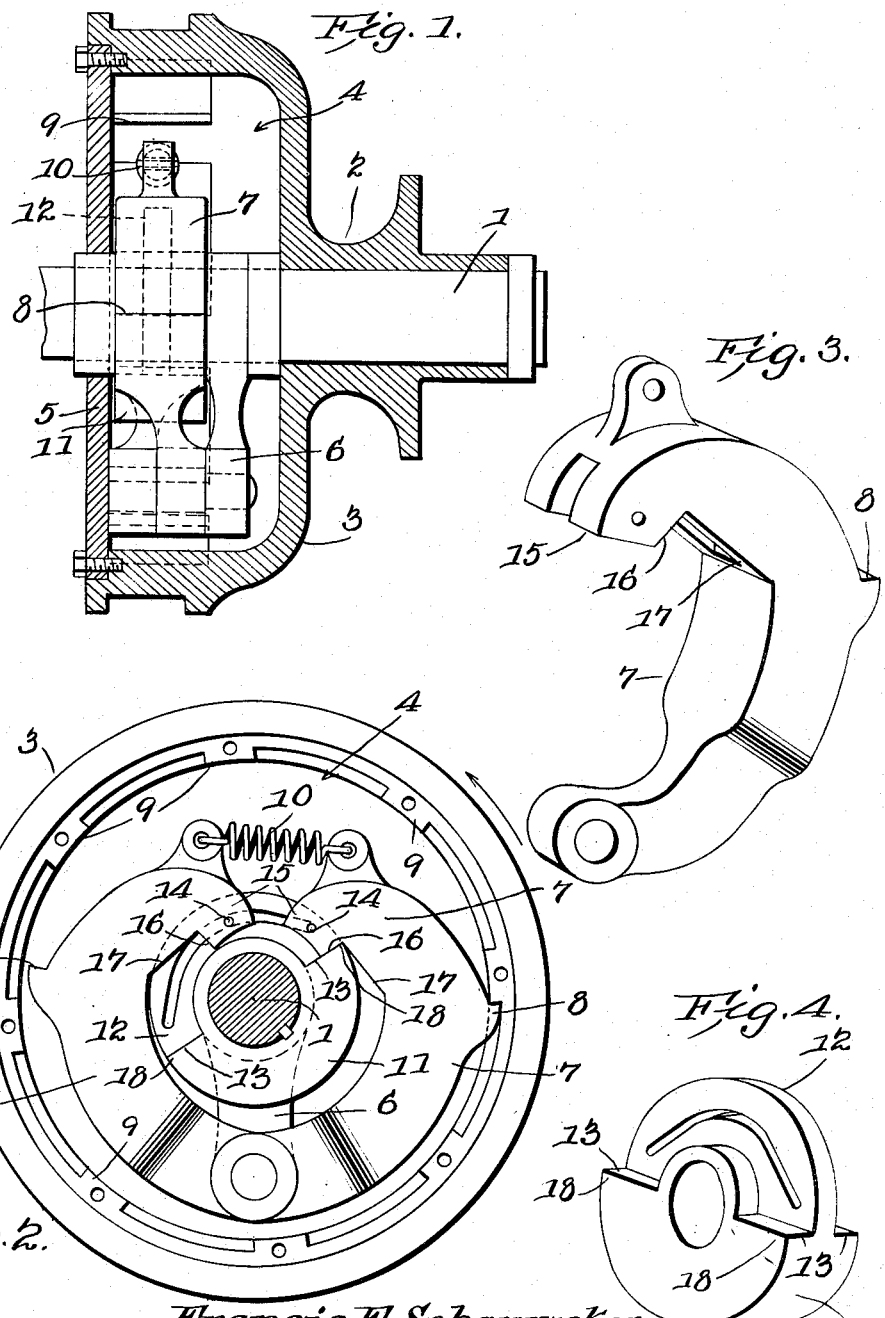

FRANCIS F. SCHAUWEKER AND RUSSELL E. ROBESON, OF CLEVELAND, OHIO.

CLUTCH MECHANISM FOR AUTOMOBILE-DRIVES.

No. 855,137. Specification of Letters Patent. Patented May 28, 1907.

Application filed May 19, 1906. Serial No. 317,787.

*To all whom it may concern:*

Be it known that we, FRANCIS F. SCHAU-WEKER and RUSSELL E. ROBESON, citizens of the United States, residing at Cleveland, in the county of Cuyahoga and State of Ohio, have invented a new and useful Clutch Mechanism for Automobile-Drives, of which the following is a specification.

The present invention relates to power transmitting mechanisms, designed more particularly for use in connection with automobiles whereby the power is imparted to the driving wheels of the vehicle by a solid live axle through the intervention of automatically reversible clutch mechanisms.

The invention relates more especially to the clutch mechanism, and its objects are to improve and simplify devices of this character so that they can be inexpensively and substantially constructed and efficiently operated to connect or disconnect the wheels with the live axle automatically, according to the relative change in speed between the axle and either, or both, wheels.

A further object is to provide a clutch mechanism by which the driving axle can be automatically disconnected from the wheels for the purpose of driving the latter alternately in a forward or a reverse direction.

With these and other objects in view, the invention comprises various features of construction and arrangement of parts, which will be hereinafter more fully described and set forth with particularity in the claims appended hereto.

In the accompanying drawing, which illustrates one of the embodiments of the invention: Figure 1 is a longitudinal section through the clutch mechanism. Fig. 2 is a side elevation thereof with the cover plate removed to expose the interior thereof. Fig. 3 is a perspective view of one of the dogs of the clutch. Fig. 4 is a perspective view of the dog actuator.

Corresponding parts in the several figures are indicated throughout by similar characters of reference.

Referring to the drawing, 1 represents one end of a solid axle of an automobile which is suitably driven from the engine or other prime mover.

2 designates the hub of a wheel mounted on the end of the axle, and formed integral, or otherwise, therewith is a brake drum 3 for a brake of the external type, and the hollow of the drum forms a chamber 4 in which the clutch mechanism is assembled. The open side of the drum 3 is closed by a cover 5 which forms, with the drum, a perfectly dust proof and, if desired, a lubricant containing casing.

Loosely mounted on the axle 1 is an arm or hanger 6 to the lower end of which are pivoted the symmetrically disposed clutch dogs or pawls 7, the latter being pivoted at their lower ends. The dogs are each provided on the outer surface with a shoulder or tooth 8, as clearly shown in Fig. 2, that is adapted to engage with the inwardly extending teeth 9 of the internal cylindrical surface of the brake drum 3. The dogs extend upwardly from their pivots around the axle 1, and are held or connected at their upper ends by an extension spring 10. For operating the dogs, the actuator 11 is employed. This comprises, preferably, a disk-shaped member keyed to the live axle 1, and is provided with a portion reduced from both sides so as to form the central tongue 12 and the diametrically opposite shoulders 13 on the opposite sides of the tongue. The free ends of the dogs are bifurcated so as to receive between their bifurcations the tongue 12. The tongue contains an arc-shaped slot arranged eccentrically with respect to the center of the axle in which engage pins 14 arranged one in each of the dogs. By this arrangement, when one dog is actuated into engagement with the teeth of the drum, the other dog is moved out of engagement with the latter. On the free ends of the dogs are inwardly extending projections or noses 15 provided with radial surfaces 16 with which the radial shoulders 13 of the actuator are adapted to squarely engage, when power is transmitted from the driving axle to either one of the wheels. Adjacent the radial shoulders 16, the dogs are each provided with a surface 17, extending substantially at right angles to the shoulder 16, so that a wiper suitably arranged on the actuator may engage with each of the surfaces 17 for actuating the dogs into their engaged position. These wipers are preferably formed by the portions 18 adjacent the shoulders 16.

From the above description, the operation of the clutch mechanism will be understood, as follows. As shown in Fig. 2, the parts may be assumed to be in position for driving the vehicle in a forward direction. Power is transmitted from the shaft 1, actuator 11, right hand dog 7 through the shoulders 13 and 16, to the drum 3 through the teeth 8 and 9. The engine will continue to drive the wheels in this manner until the vehicle tends to exceed the speed of the engine, as in going down hill, or when turning a curve, when the wheels or wheel rotate faster than the axle and become automatically unclutched from the axle for the time being. When, however, the engine resumes its load, the wheels will be driven by means of the clutch or clutches, as before. If it is desired to run the vehicle in a reverse direction, all that is necessary is to actuate the usual reversing mechanism between the engine and the live axle to drive the latter in an opposite direction, indicated by the dotted arrow in Fig. 2. The axle will, in part of a revolution, disconnect the right hand dog, and connect the left hand one. This is accomplished by means of the actuator 11 whose left hand wiper 18 moves the adjacent dog into engagement with the teeth 9, and whose slot, 19, causes the right hand dog to be retracted and moved to an inward position out of the path of the teeth 9. The spring 10 is under sufficient tension to assist the slot and pin connection between the actuator and dogs to retract the latter.

It will thus be seen that by means of the present invention, the wheels of the vehicle may be positively driven in either a forward or reverse direction, and that the change in travel of the vehicle can be accomplished automatically by means of the clutches, and the wheels are enabled to move faster than the driving axle and run free of the latter when the speed of the vehicle exceeds that due to the engine.

We have described the principle of operation of the invention, together with the apparatus which we now consider to be the best embodiment thereof, and we desire to have it understood that the apparatus shown is merely illustrative, and that various changes in the design, construction and arrangements of the parts, may be resorted to without sacrificing any of the principles or advantages of the invention, as, for instance, more than two dogs, as shown, may be employed, and instead of the interlocking teeth 8 and 9 between the dogs and drum, suitable frictionally engaging surfaces may be used, all of which changes are embraced within the scope of the claims appended.

What is claimed is:—

1. In a device of the class described, the combination of a driving shaft, an arm loosely mounted on the shaft, a pair of dogs hingedly connected to the outer end of the arm, a drum extending around the dogs and adapted to be engaged by the latter at approximately diametrically opposite points, and an actuator for the dogs keyed on the shaft and connected with the dogs to move one into engagement with the drum while moving the other out of engagement.

2. In a device of the class described, the combination of a driving element, a driven element having a toothed cylindrical wall, clutching members adapted to engage the said wall, a member loosely mounted on the driving element, a pivot on the said member for the clutching members, and an actuator secured to the driving element to rotate therewith for engaging one of the members while simultaneously disengaging the other to drive the driven member in either direction.

3. In a device of the class described, the combination of a driving and a driven element, clutching members between them, an arm loosely mounted on the driving element and extending radially from the center of the latter, means hingedly connecting the members to the arm, an actuator mounted on the driving element for actuating the members to drive the driven member in either direction, and a spring arranged to assist in the movement of the members and to hold the latter in operative engagement with the actuator.

4. In a device of the class described, the combination of a driving and a driven element, an arm loosely mounted on the driving element, symmetrically disposed dogs pivoted on said arm which are adapted to engage the driven element, and an actuator on the driving element arranged to actuate the dogs so that the driven element may be automatically driven in either direction or permitted to run free of the driving element.

5. In a device of the class described, the combination of a driving and a driven element, dogs mounted between them which are provided with radially extending shoulders, an actuator positively connected with the driving element which is provided with radial shoulders adapted to engage those of the dogs for holding the latter in locked position with the driven element, and means for supporting the dogs.

6. In a device of the class described, the combination of a driving and a driven element, dogs mounted between them which are provided with radially extending shoulders, an actuator having shoulders adapted to engage those of the dogs, and a slot and pin connection between the actuator and the dogs.

7. In a device of the class described, the combination of a driving and a driven element, dogs mounted between them which are provided with bifurcated ends, an actuator having a tongue extending into the bifurcation of said dogs, a connection between each dog and the tongue whereby the actuator imparts motion to the dogs, and means between the actuator and the dogs for holding the latter in locked position.

8. In a device of the class described, the combination of a driving and a driven element, dogs provided with shoulders and surfaces arranged at an angle thereto, an actuator for the dogs provided with shoulders adapted to interlock with those on the latter, and means on the actuator engaging said surfaces for imparting movement to the dogs.

9. In a device of the class described, the combination of a driving and a driven element, dogs provided with shoulders and surfaces arranged at an angle thereto, an actuator for the dogs provided with shoulders adapted to interlock with those on the latter, means on the actuator engaging said surfaces for imparting movement to one of the dogs at a time, and connections between the actuator and the dogs whereby the latter are moved simultaneously.

10. In a device of the class described, the combination of a driving and a driven element, dogs provided with shoulders and surfaces arranged at an angle thereto, an actuator for the dogs provided with shoulders adapted to interlock with those on the latter, means on the actuator engaging said surfaces for imparting movement to one of the dogs at a time, connections between the actuator and the dogs for moving the latter simultaneously, and a spring connected with the dogs which operate in conjunction with said connections to actuate the latter.

11. In a device of the class described, the combination of a driving and a driven element, dogs provided with bifurcated noses and surfaces arranged adjacent the latter, an actuator connected with the driving element provided with a tongue engaging the bifurcations of said noses and with shoulders interlocking with the noses, means on the actuator coöperating with the said surfaces for moving the dogs, groove and pin connections between the actuator and dogs, and a spring connecting the dogs together.

12. In a device of the class described, the combination of a driving and a driven element, a covered drum carried by the driven element, and means for supporting the elements in coöperative relation, with a clutch mechanism arranged in the drum for automatically connecting the driving and driven elements for rotating the latter in either direction and for automatically disconnecting them, said mechanism comprising an arm loosely mounted on the driving element, symmetrically disposed dogs pivoted on the arm, an actuator arranged between the dogs and keyed to the driving element, interlocking shoulders between the actuator and dogs, means between the dogs and actuator for moving the dogs simultaneously, an extension spring connected with the free ends of the dogs, and interlocking teeth on the said drum and dogs.

In testimony that we claim the foregoing as our own, we have hereto affixed our signatures in the presence of two witnesses.

FRANCIS F. SCHAUWEKER.
RUSSELL E. ROBESON.

Witnesses:
J. B. MOORE,
GEO. MEIER.